March 14, 1972  F. L. KNOWLES  3,649,726
METHOD FOR CONTROLLING THE THICKNESS
OF POLYMERIC FILM STRUCTURES
Filed Sept. 20, 1968  2 Sheets-Sheet 1

INVENTOR
FREDERICK LYNN KNOWLES

BY *Claude L. Beaudoin*
ATTORNEY

INVENTOR
FREDERICK LYNN KNOWLES

BY Claude T. Beaudoin

ATTORNEY

United States Patent Office 3,649,726
Patented Mar. 14, 1972

3,649,726
METHOD FOR CONTROLLING THE THICKNESS OF POLYMERIC FILM STRUCTURES
Frederick Lynn Knowles, Florence, S.C., assignor to E. I. du Pont de Nemours and Company, Wilmington, Del.
Filed Sept. 20, 1968, Ser. No. 761,241
Int. Cl. B29d 7/24
U.S. Cl. 264—40                                    8 Claims

ABSTRACT OF THE DISCLOSURE

A method is provided for manufacturing film structures of organic thermoplastic polymeric materials of improved thickness uniformity across the width thereof. Briefly, the method comprises measuring the thickness of a film structure at any location across the width thereof before stretching, measuring the thickness of said film structure at any location across the width thereof after stretching, computing the cumulative mass values of said film structure across the width thereof before and after stretching, and adjusting the thickness of said film structure at any point across the width thereof before stretching responsive to deviation from a preselected value in thickness of said film structure after stretching corresponding to the cumulative mass value of said film structure before and after stretching.

---

The present invention relates to a method for processing film structures of organic thermoplastic polymeric materials and, more particularly, is directed to a method for processing polymeric structures of improved thickness uniformity or gauge across the width thereof.

In the manufacture of continuous lengths of film structures of polymeric materials it is very difficult to produce film structures that are uniformly flat from edge to edge. Ordinarily, thicker or thinner lanes appear across the width of the film structures which render such film structures unsuitable for many uses and, furthermore, results in poor roll formation when winding the film structures into roll form. The above-mentioned thickness variation not only includes gradual changes in thickness from edge-to-edge of the film structures, but also includes relatively narrow bands wherein the thickness of the film changes abruptly from the average at that point or from a preselected value. Numerous apparatus and techniques have evolved to sense thickness deviations and effect adjustment of film thickness at specific locations usually at or near the point of extrusion of the polymeric material in the film forming operation. For instance, U.S. Pat. Nos. 3,122,782 and 3,122,783 describe mechanical arrangements for adjusting the thickness of selected hypothetical lanes across a film structure corresponding to thicker or thinner portions of the film. Specifically, U.S. Pat. No. 3,122,782 describes the application of two interconnected multiple-junction terminal boards disposed intermediate a film thickness sensing gauge and adjustment means for changing the width of the extrusion orifice from whence the film structure issues. The film thickness gauge measures the thickness of the film structure and transmits a bias signal through suitable relay elements for energizing motors which are so constructed and arranged to cause opening or closing of the orifice opening in the extruder in accordance with the deviation in the thickness of the film that is sensed by the film thickness measuring gauge. The bias signal is adjusted to selectively energize one of many motors thereby to restrict the adjustment of the extruder orifice over only a localized portion of the entire orifice structure. Adjustment of the bias signal is accomplished by means of the two interconnected multiple-junction terminal boards, wherein the first terminal board is operatively connected to the film thickness measuring gauge and the second terminal bard is operatively connected through the aforementioned relay elements to the motors for adjusting the extruder orifice opening. The first terminal board contains a greater number of junctions, corresponding in number to thickness sensing points and hypothetical longitudinal lanes in the extruded film structure, than the second terminal board so that film thickness deviations from several sensing points are transmitted through the interconnected terminal boards to a single adjustment point. Another method for improving the thickness uniformity of polymeric film structures is described in U.S. Pat. No. 3,161,711 which discloses heating selected longitudinal lanes of greater thickness of amorphous polymeric films followed by cooling the entire film whereby to effect a more marked temperature differential between the thinner and the thicker longitudinal lanes of the film structure, followed lastly by stretching the unsupported film structure thereby to obtain a film structure of improved thickness uniformity.

Identifying the precise location at the source or origin of the film structure as at the extruder orifice that corresponds to the location of the film thickness deviation sensed at a point remote therefrom is very difficult. The difficulty is especially apparent in film structures which are stretched after being cast or extruded, with the result that unpredictable lateral migration of characteristics or features often occurs as the film structure passes from the point of origin (extrusion) to the point of film thickness sensing at or near the end of the film making process. The net result is that adjustments are frequently made at unwanted locations, causing a magnification rather than a decrease in gauge deviation. Thus, automatic control apparatus adapted for the adjustment of film thickness having a thickness sensing device which transversely scans the moving web near the finished end, transmitting a signal for appropriate apparatus adjustment near the origin of the film, is severely handicapped and often totally frustrated especially when intermediate stretching operations are introduced which prevent adjustments at the correct points in order to nullify or minimize the deficiency sensed at the remote location. The foregoing is particularly true as regards the correction of thickness deviations of film structures extruded from flat dies and which are biaxially stretched in mutually perpendicular directions. Often the extrusion die does not have parallel lips, but lips which are spaced apart to extrude a contoured film of lenticular cross-section having beads at each edge adapted to be gripped by clips for transverse stretching; the lenticular cross-section compensates for the greater extent to which the center portion of the film stretches when the film is stretched in its longitudinal direction. The degree to which each increment of film across the width changes in the stretching process as a function of the purposely constructed contour can be estimated with fair accuracy, but the non-uniformities in thickness arising from flow irregularities through the extruder can cause irregularities in the stretching pattern so that an increment of film width is displaced across the film to an unpredictable degree. Further, it is difficult, if not impossible, to correlate the location of a deviation on the stretched film to a location on the film prior to stretching.

According to the present invention, there is provided an apparatus having means operable on a moving film structure adapted to be subjected to a transverse change in dimension for correlating the location of a feature on the film structure after the change in its transverse dimension with respect to the location of said feature prior to the change in dimension of the film structure. According to the present invention there are further provided process means for correlating the transverse location thickness characteristics of film structures after stretching with the transverse location of said features on the film structure before stretching.

According to the present invention there is further provided a method for controlling the thickness of a film structure of organic thermoplastic polymeric material that is stretched in at least one of its two planar directions of length and width which comprises measuring the thickness of said film structure at any location across the width thereof before stretching, measuring the thickness of said film structure at any location across the width thereof after stretching; computing the cumulative mass values of said film structure across the width thereof before and after stretching; adjusting the thickness of said film structure at any point across the width thereof before stretching responsive to deviation from a preselected value in thickness of said film structure after stretching corresponding to the cumulative mass value of said film structure before and after stretching.

The nature and advantages of the invention will be more clearly understood by the following description and the accompanying drawings in which:

FIG. 1 diagrammatically illustrates the apparatus of the invention depicting the relationship of its basic elements;

Figure 1:
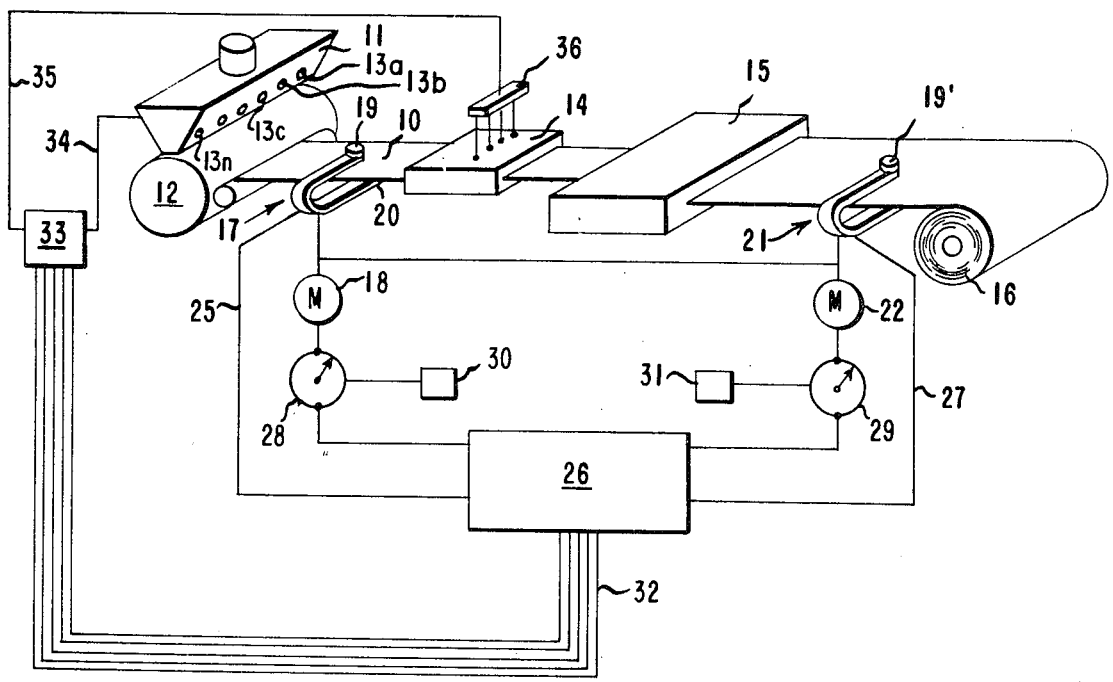

The apparatus herein disclosed in illustration of the invention includes an extruding die 11 adapted to continuously cast a substantially flat film structure 10 of organic thermoplastic polymeric material such as, for example, polyethylene terephthalate. The film structure 10 is preferably continuously cast from extruding die 11 onto quench drum 12 which may be cooled by circulating any suitable cooling medium internally thereof by any expedients well known in the art. The extruding die 11 is provided with a plurality of adjustment devices 13a, 13b, 13c . . . 13n spaced across its width and so constructed and arranged whereby the opening of the slit-like die orifice (not shown) may be adjusted to control the thicnkess of the extruded film 10. From quench drum 12 the film 10 enters film heating device 14 which has a plurality of separately adjustable, elongated, tubular radiant heaters (not shown) positioned close to the film structure so that the long axis of each tubular radiant heater is parallel to and extends in the direction of movement of the film. Each heating element in heating device 14 is placed in close, spaced-apart relationship across the width of film 10. A suitable heating device is that described in U.S. Pat. No. 3,161,711. The film structure 10 next advances to stretching apparatus 15 wherein the film is heated to a temperature at which orientation occurs (any temperature within the range specified in U.S. Pat. No. 2,823,421 is satisfactory) and the film structure is stretched in either of its longitudinal or transverse directions, or in both directions, in any known manner as described in, for example, U.S. Pat. Nos. 2,823,421 and 2,995,779. The film structure is preferably next heat-set in any manner as well known in the art as by subjecting the film structure to heat-setting tempertaures of 150° C. to 250° C., and thereafter the film is advanced to a windup station whereat it is wound into roll form such as 16.

The foregoing describes the film forming apparatus and operation in its most simple essential form, and it is the purpose and object of the present invention to provide improvements therein which will be operative to provide film structures having improved thickness uniformity or gauge across the width thereof.

The film thickness measuring gauge 17 is disposed between quench drum 12 and film heating device 14. The thickness measuring gauge 17 is so constructed and arranged as to traverse the width of continuously advancing film structure 10 responsive to motive power derived from electric motor 18, and gauge 17 is adapted to generate an electrical output signal that is a function of the thickness of film structure 10. The film thickness measuring gauge is of well known construction consisting generally of a radiation source disposed on one side of the film structure and adapted to emit radiation such as beta rays, and a receiver or detector disposed on the other side of the film structure which is adapted to receive the radiation emitted by the radiation source and provide an electrical signal which is proportional to the thickness of the film structure at the point of measurement thereof. The film thickness measuring gauge ordinarily comprises a U-shaped bracket as shown in FIG. 1 supporting a radiation source 19 on one arm thereof and a receiver 20 on the other arm thereof. As shown in FIG. 1, the apparatus of the present invention is further characterized by film thickness measuring gauge 21 having a radiation source 19' and being of similar construction to gauge 17 but which is disposed between the film stretching device 15 and the film roll 16. Film thickness measuring gauge 21 functions in the same manner as gauge 17 and is adapted to traverse the width of continuous advancing stretched film structure 10 responsive to motive power derived from electric motor 22. The film thickness measuring gauge 21 is adapted to generate an electrical output signal that is a function of the thickness of stretched film structure 10.

Figure 2:
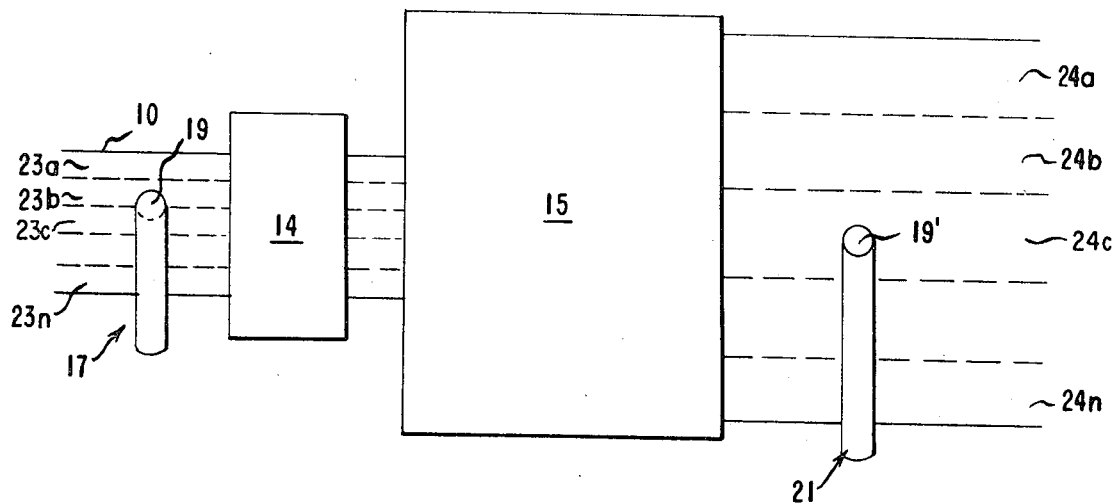
FIG. 2 is a schematic illustration of a change in transverse dimension effected by in-plane stretching of a film in its transverse direction.

For purposes of the present invention, as shown in FIG. 2, the film structure 10 is divided into a plurality of hypothetical lanes, 23a ,23b, 23c . . . 23n in the film before any change in film width and hypothetical lanes 24a, 24b, 24c . . . 24n in the film after stretching. The signal corresponding to the thickness of each preselected hypothetical lane of the film before stretching derived from gauge 17 is transmitted by conductor 25 to general purpose digital computer 26 which converts the analog film thickness functional signal to a digital film thickness functional signal and stores the digital thickness signal of each preselected hypothetical film lane in a separate storage cell therewithin. Computer 26 is adapted to numerically integrate the stored digital film thickness signals. The signal corresponding to the thickness of each preselected hypothetical lane of film structure 10 after stretching derived from gauge 21 is transmitted by conductor 27 to computer 26 which also converts each signal to a digital film thickness functional signal, and each such signal is stored in computer 26. A suitable computer for this purpose is a Model 609 computer manufactured by Information Systems, Inc. Skokie, Ill.

The apparatus of the present invention is further characterized by rotary switch 28 an rotary switch 29 each so constructed and arranged as to make one revolution for each preselected hypothetical lane traversed by gauges 17 and 21, respectively. Gauge 17 is operatively connected to rotary switch 28 and gauge 21 is operatively connected to rotary switch 29, and each gauge is adjusted to close each respective rotary switch at the instant the scanning head of each gauge passes over the center of the preselected hypothetical lane. Each closed rotary switch momentarily completes the electrical circuit between respective power sources 30 and 31 which transmit an electrical pulse to computer 26 for directing (by means of appropriate pulse-sensing circuits and relays within computer 26) the digital film thickness functional signal to a storage cell in the computer corresponding to the hypothetical film lane.

The above-described film thickness gauges 17 and 21 are programmed to traverse film structure 10 a preselected number of times and the digital film thickness functional signal of each preselected hypothetical film lane obtained during each traverse is accumulated by the computer which then determines the average deviation of the film thickness based upon a predetermined reference thickness value (converted and stored in the computer in digital form) for each hypothetical film lane. The computer 26 is programmed to compute the cumulative thickness values of a given number of hypothetical film lanes, beginning from the edge lane, and the value thus determined is proportional to the mass of the film structure from its edge to the selected hypothetical film lane. The computer 26 is programmed to compare the cumulative mass of the film structure, as above indicated, before and after stretching, thus enabling the computer to ascertain the location on the film structure before stretching corresponding to the cumulative mass of the film structure after stretching. It is thus possible by the above described sequential comparison of cumulative mass of the hypothetical film lanes to direct adjustment signals to the appropriate one of adjustment devices 13 for changing the orifice opening at that location on the extruding die 11 thereby to remedy any deviation in film thickness occurring at that location on film structure 10.

The foregoing is readily accomplished in the following manner, referring to FIG. 1. Computer 26 ascertains a film thickness deviation which may vary from a preselected value or may vary from a sheet average based upon the film thickness functional signal it receives, converts and stores from gauge 21. Computer 26 then determines the percentage of cumulative film thickness values (i.e. mass) to the particular hypothetical film lane in the stretched film, and by successive comparison determines the location (lane) on the cast film before stretching having the most nearly corresponding cumulative mass value. The computer 26 next transmits a deviation signal which is a correction signal that is a function of the film thickness deviation after stretching along multiple-conductor cable 32 to switch 33 where it may be re-directed either along cable 34 for adjusting the opening of the orifice lips of extruding die 11 by means of adjusters 13a, 13b, 13c . . . 13n, or it may be directed along cable 35 to heating device 14 for controlling the longitudinal lane heaters. Adjustment of the orifice lips in extruding die 11 is effected by controlling the operation of a motor drive so constructed and arranged as to open or close the orifice lips; such mechanism is well known in the art and described in, for example, U.S. Pats. Nos. 3,122,782; 3,122,783 and 3,212,127. Satisfactory film thickness control can usually be achieved by adjusting the power input to the longitudinal lane heaters of heating device 14. For this purpose, heating device 14 is equipped with controller 36 which has motor-driven variable transformers calibrated to provide an appropriate change in power to the heater in response to the magnitude of the deviation or correction signal which represents a specific deviation in the thickness of the stretched film 10.

Figure 3:
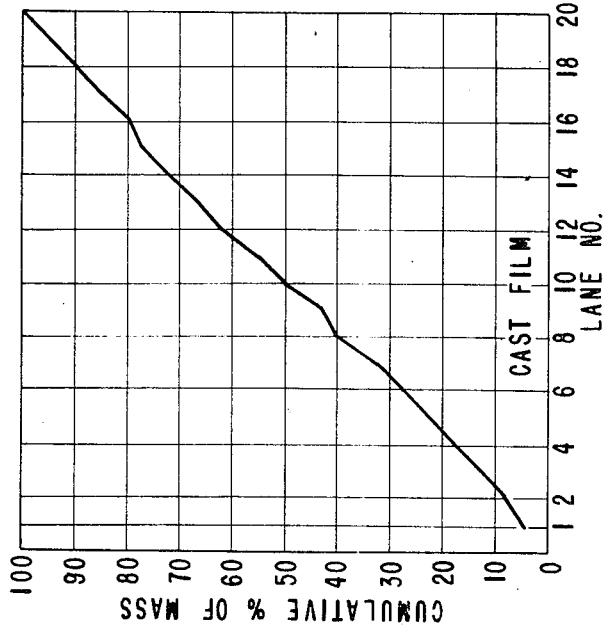
FIG. 3 is a graphic illustration of the cumulative mass of a cast film of polyethylene terephthalate plotted against a selected number of lanes across the width of the film.
Figure 4:
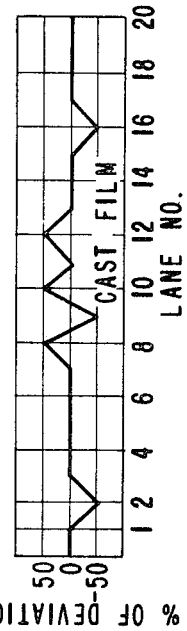
FIG. 4 shows graphically the percent deviation of the film thickness distributed across the width of the film of FIG. 3.
Figure 5:
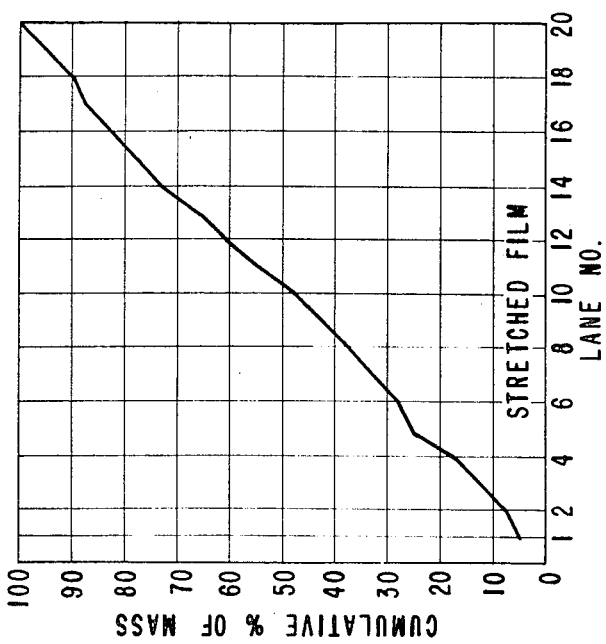
FIG. 5 is a graphic illustration of the lateral displacement in thickness characteristics of a film structure as effected by transverse stretching.
Figure 6:
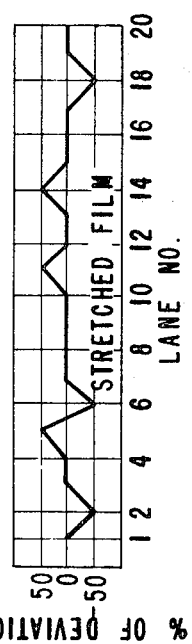
FIG. 6 shows graphically the percent deviation of the film thickness distributed across the width of the film of FIG. 5.

The advantages of the present invention are demonstrated in the following illustration considered in connection with FIG. 3 and Table 1 herebelow:

ILLUSTRATION NO. 1

A polyethylene terephthalate film was produced by a continuous polymerization process integrated with a casting and stretching operation to produce a biaxially oriented film. The molten polymer was extruded from a hopper having a slit orifice and cast onto an internally cooled quench drum from which it was stripped and thereafter sequentially stretched, first in the machine direction (MD, direction of extrusion) and then in the transverse direction (TD). The extrusion hopper was equipped with a plurality of adjustment bolts to adjust the clearance between the essential edges of the lips forming the slit orifice, thus controlling the thickness of the web. This adjustment was used for gross manual control, but also was suitable for closed loop automatic control. The stretching apparatus was equipped with a series of separately adjustable lane heaters positioned adjacent the web just before the first direction stretch, and disposed lengthwise in MD to provide a parallel array across the web whereby thicker lanes could be selectively heated to alter the drawing characteristics and control the thickness uniformity of the sheet. Thickness measuring elements, as herein described, were employed to provide an output signal functional of the thickness of the cast film in separate lanes across the web; and similar elements were employed to provide similar data on the stretched film. These signals were fed to a computer which computed the deviation from a preselected thickness value, the cumulative percentage of mass at each of the respective lanes from one edge across the film as indicated in the table below, with means for comparison to determine the location of equivalent masses and direct the deviation control signal to the appropriate lane for adjustment of the thickness controlling means. These data were printed out and could be used for manual adjustment after selection of the proper lane for adjustment from the printout data. In this operation the data were employed in a closed loop automatic control system by the programmed computer which directed adjustment signals to the motor driven controls on each of the plurality of separate individually adjustable lane heaters (see U.S. Pat. 3,161,711) to adjust the heat input to a lane on the film before stretching and establish a temperature differential between the thicker and thinner lanes.

Greater gauge uniformity was observed on separate samples of the sheets by direct measurement after using this gauge control apparatus, than without an automatic control apparatus, or with apparatus which directed the adjustment signal from the detected gauge deviation to the adjustment means at a location on the web based on the fraction of the distance across the web, rather than a location based on the fraction of the mass of the web. Improvement was more effectively shown, however, by an approximately 20% reduction over an extended period of time in the number of film rolls rejected for gauge related defects, such as distorted rolls and gauge bands.

TABLE.—CUMULATIVE MASS AND PERCENT THICKNESS DEVIATION OF POLYETHYLENE TEREPHTHALATE FILM

Before stretching

| Lane No. | Percent thickness deviation | Cumulative percent mass | Lane No. | Percent thickness deviation | Cumulative percent mass |
|---|---|---|---|---|---|
| 5 | −18.1 | 2.2 | 24 | +21.3 | 51.7 |
| 6 | −18.3 | 4.4 | 25 | +20.8 | 54.8 |
| 7 | −18.0 | 6.6 | 26 | +21.3 | 58.0 |
| 8 | −17.8 | 8.8 | 27 | +17.8 | 61.0 |
| 9 | −17.2 | 11.0 | 28 | +15.6 | 64.0 |
| 10 | −17.8 | 13.2 | 29 | +12.7 | 67.0 |
| 11 | −12.7 | 15.5 | 30 | +10.2 | 69.9 |
| 12 | −11.9 | 17.9 | 31 | +4.6 | 72.6 |
| 13 | −8.0 | 20.3 | 32 | +10.2 | 75.5 |
| 14 | −2.2 | 22.9 | 33 | +5.9 | 78.3 |
| 15 | −0.8 | 25.5 | 34 | +1.9 | 80.9 |
| 16 | −1.9 | 28.1 | 35 | −0.2 | 83.6 |
| 17 | +3.3 | 30.8 | 36 | −1.8 | 86.2 |
| 18 | +6.7 | 33.6 | 37 | −6.5 | 88.6 |
| 19 | +8.9 | 36.4 | 38 | −8.7 | 91.0 |
| 20 | +12.4 | 39.4 | 39 | −12.7 | 93.4 |
| 21 | −16.0 | 42.4 | 40 | −16.7 | 95.6 |
| 22 | +17.9 | 45.4 | 41 | −17.3 | 97.8 |
| 23 | +19.4 | 48.5 | 42 | −18.3 | 100.0 |

TABLE—Continued

| Lane No. | Percent thickness deviation | Cumulative percent mass | Lane No. | Percent thickness deviation | Cumulative percent mass |
|---|---|---|---|---|---|
| After stretching ||||||
| 1 | −4.6 | 1.1 | 46 | −3.7 | 51.3 |
| 2 | −5.7 | 2.1 | 47 | −3.0 | 52.4 |
| 3 | −6.2 | 3.2 | 48 | −2.2 | 53.5 |
| 4 | −6.6 | 4.2 | 49 | −0.9 | 54.6 |
| 5 | −7.3 | 5.3 | 50 | −0.1 | 55.7 |
| 6 | −8.6 | 6.3 | 51 | +1.7 | 56.9 |
| 7 | −9.0 | 7.3 | 52 | +2.4 | 58.0 |
| 8 | −8.1 | 8.3 | 53 | +3.4 | 59.2 |
| 9 | −7.7 | 9.4 | 53 | +5.0 | 64.0 |
| 10 | −6.9 | 10.4 | 55 | +6.3 | 61.5 |
| 11 | −4.5 | 11.5 | 56 | +7.4 | 62.8 |
| 12 | −1.2 | 12.6 | 57 | +8.1 | 64.0 |
| 13 | +2.6 | 13.8 | 58 | +8.8 | 65.2 |
| 14 | +6.5 | 15.0 | 59 | +9.3 | 66.4 |
| 15 | +7.8 | 16.2 | 60 | +10.7 | 67.7 |
| 16 | +9.1 | 17.4 | 61 | +8.3 | 68.9 |
| 17 | +10.6 | 18.6 | 62 | +7.3 | 70.1 |
| 18 | +1.9 | 19.8 | 63 | +3.3 | 71.2 |
| 19 | −0.2 | 20.9 | 64 | +1.1 | 72.4 |
| 20 | −3.6 | 22.0 | 65 | +0.2 | 73.5 |
| 21 | −0.1 | 23.1 | 66 | −3.7 | 74.6 |
| 22 | +1.4 | 24.3 | 67 | −5.0 | 75.7 |
| 23 | +1.8 | 25.4 | 68 | −4.0 | 76.6 |
| 24 | +7.2 | 26.6 | 69 | −5.3 | 77.8 |
| 25 | +9.0 | 27.8 | 70 | −6.0 | 78.9 |
| 26 | +1.9 | 29.0 | 71 | −7.2 | 79.9 |
| 27 | +0.2 | 30.1 | 72 | −8.6 | 80.9 |
| 28 | −3.7 | 31.2 | 73 | −5.7 | 82.0 |
| 29 | −9.0 | 32.2 | 74 | −3.4 | 83.1 |
| 30 | −7.8 | 33.2 | 75 | −3.4 | 84.1 |
| 31 | −4.4 | 34.3 | 76 | −1.2 | 85.3 |
| 32 | −3.0 | 35.4 | 77 | −5.7 | 86.3 |
| 33 | −0.5 | 36.5 | 78 | −7.8 | 87.3 |
| 34 | +4.3 | 37.7 | 79 | −5.7 | 88.4 |
| 35 | +7.1 | 38.9 | 80 | −3.8 | 89.5 |
| 36 | +8.4 | 40.1 | 81 | +0.7 | 90.6 |
| 37 | +10.0 | 41.3 | 82 | +4.2 | 91.8 |
| 38 | +7.3 | 42.5 | 83 | +7.8 | 93.0 |
| 39 | −1.2 | 43.7 | 84 | +9.4 | 94.2 |
| 40 | −3.3 | 44.7 | 85 | +10.6 | 95.5 |
| 41 | −6.9 | 45.8 | 86 | +7.8 | 96.7 |
| 42 | −4.0 | 46.9 | 87 | +4.9 | 97.9 |
| 43 | −1.4 | 48.0 | 88 | −0.6 | 99.0 |
| 44 | +2.0 | 49.1 | 89 | −6.3 | 100.0 |
| 45 | −1.1 | 50.2 | | | |

What is claimed is:

1. A method for controlling the thickness of a film structure of organic thermoplastic polymeric material that is stretched in at least one of its two planar directions of length and width which comprises:
   measuring the film thickness in each of a plurality of hypothetical planes across the widths of the film before and after stretching;
   determining any average deviation of the film thickness in each lane after stretching from a preselected value;
   determining the cumulative mass value to a deviating lane by integrating the measured thickness values from one edge of the film to the lane;
   determining the location of the lane in the unstretched film which has a cumulative mass value corresponding to that of the deviating lane in the stretched film; and
   making the appropirate adjustment in a thickness controlling means which affects the determining lane in the unstretched film in order to bring the deviating lane to the desired value.

2. The method of claim 1 including the further step of: transmitting a deviation signal that is a function of the film thickness deviation for making the appropriate adjustment in the thickness controlling means.

3. The method of claim 1 wherein the thickness of said film structure at any point across the width thereof before stretching is adjusted by varying the opening of orifice lips in an extruding die from which said film structure issues.

4. The method of claim 1 wherein the thickness of said film structure at any point across the width thereof before stretching is adjusted by heating said film structure and thereafter stretching it.

5. A method of manufacture for controlling the thickness of a film structure or organic thermoplastic polymeric material that is stretched in at least one of its planar directions of length and width which comprises
   sensing the thickness of said film structure at any location across the width thereof before stretching;
   transmitting first control signals that are a function of the thickness of said film structure at any point across the width thereof before stretching;
   sensing the thickness of said film structure at any location across the width thereof after stretching;
   transmitting second control signals that are a function of the thickness of said film structure at any point across the width thereof after stretching;
   accumulating said first control signals and said second control signals for computing cumulative mass values of said film structure across the width thereof before and after stretching;
   determining any average deviation of the film structure thickness at each location after stretching from a preselected value;
   determining the cumulative mass value to a deviating location by integrating the measured thickness values from one edge of the film structure to the location;
   transmitting a deviation signal to a thickness control means for adjusting the thickness at any point across the width of said film structure before stretching.

6. The method of claim 5 wherein the thickness of said film structure at any point across the width thereof before stretching is adjusted by varying the opening of orifice lips in an extruding die from which said film structure issues.

7. The method of claim 5 wherein the thickness of said film structure at any point across the width thereof before stretching is adjusted by heating said film structure and thereafter stretching it.

8. A method for manufacturing a film structure of organic thermoplastic polymeric material of improved thickness uniformity across the width thereof which comprises:
   measuring the thickness of the film structure at a plurality of locations across the width thereof between a quench drum and a heating device and before it is stretched and, thereafter, measuring the thickness thereof between a stretching device and a film roll and after it is stretched;
   determining any average deviation of the film structure thickness at each location after stretching from a preselected value;
   determining the cumulative mass value to a deviating location by integrating the measured thickness values from one edge of the film structure to the location;
   determining the location in the unstretched film structure which has a cumulative mass value corresponding to that of the deviating location in the stretched film structure; and
   making the appropriate adjustment in a film structure thickness controlling means which affects the determined location in the unstretched film in order to bring the deviating location to the desired value.

References Cited

UNITED STATES PATENTS 3,212,127    10/1965    Flook, et al.    18—2 I
3,347,960    10/1967    Fenley    264—40

ROBERT F. WHITE, Primary Examiner

J. H. SILBAUGH, Assistant Examiner

U.S. Cl. X.R.

18—2 HA; 250—83.3 D; 264—210 R, 289